United States Patent [19]

Swartz

[11] 4,243,449
[45] Jan. 6, 1981

[54] PROCESS FOR SEALING A PLURALITY OF POLYBUTYLENE SHEETS

[75] Inventor: Jeffrey L. Swartz, Brighton, Mass.

[73] Assignee: Microseal Plastics Corporation, Chestnut Hill, Mass.

[21] Appl. No.: 907,994

[22] Filed: May 22, 1978

Related U.S. Application Data

[63] Continuation-in-part of Ser. No. 763,819, Jan. 31, 1977, abandoned.

[51] Int. Cl.³ .................... B29C 25/00; B32B 31/24
[52] U.S. Cl. ................................ 156/82; 156/497; 156/498; 156/499
[58] Field of Search ............... 156/82, 497, 498, 499, 156/88, 157, 251, 324; 264/80, 348

[56] References Cited

U.S. PATENT DOCUMENTS

| 2,488,212 | 11/1949 | Lloyd | 156/82 |
| 2,606,850 | 8/1952 | Piazze | 156/499 |
| 2,691,474 | 10/1954 | Olson | 156/497 |
| 2,979,113 | 4/1961 | Stageberg | 156/499 |
| 3,066,064 | 11/1962 | Pommer | 156/498 |
| 3,413,175 | 11/1968 | Rochla | 156/499 |
| 3,736,219 | 5/1973 | McTaggart | 156/82 |

Primary Examiner—Caleb Weston
Attorney, Agent, or Firm—Morse, Altman, Oates & Dacey

[57] ABSTRACT

A linear seal joining a plurality of polybutylene sheets is produced by (1) clamping the sheets between a pair of heat conducting members with free edges of the sheets protruding to form a relaxed skirt, (2) concentrating fusing heat on the skirt to form a tacky weld joining the free edges, and (3) subjecting the weld to an aqueous surfactant fluid by which unwanted tackiness of the weld is eliminated. Apparatus is disclosed for performing the foregoing process. A polybutylene product of the foregoing process is disclosed.

15 Claims, 10 Drawing Figures

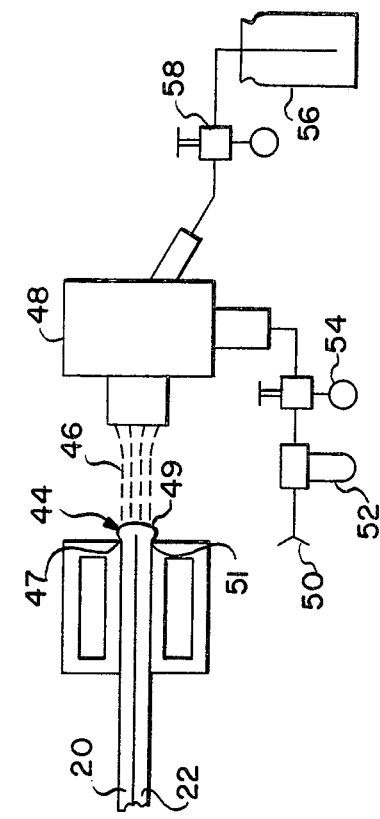
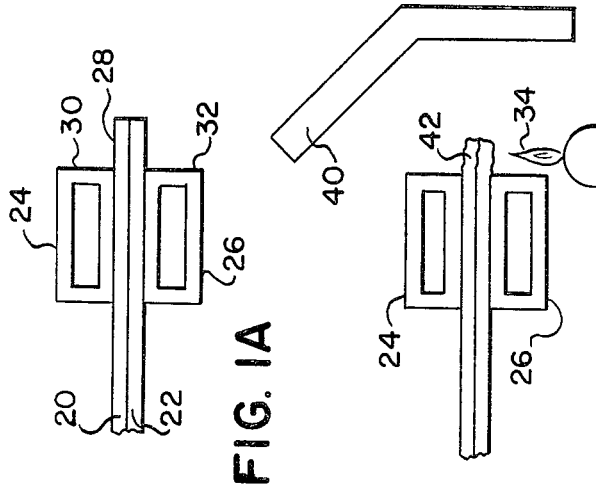
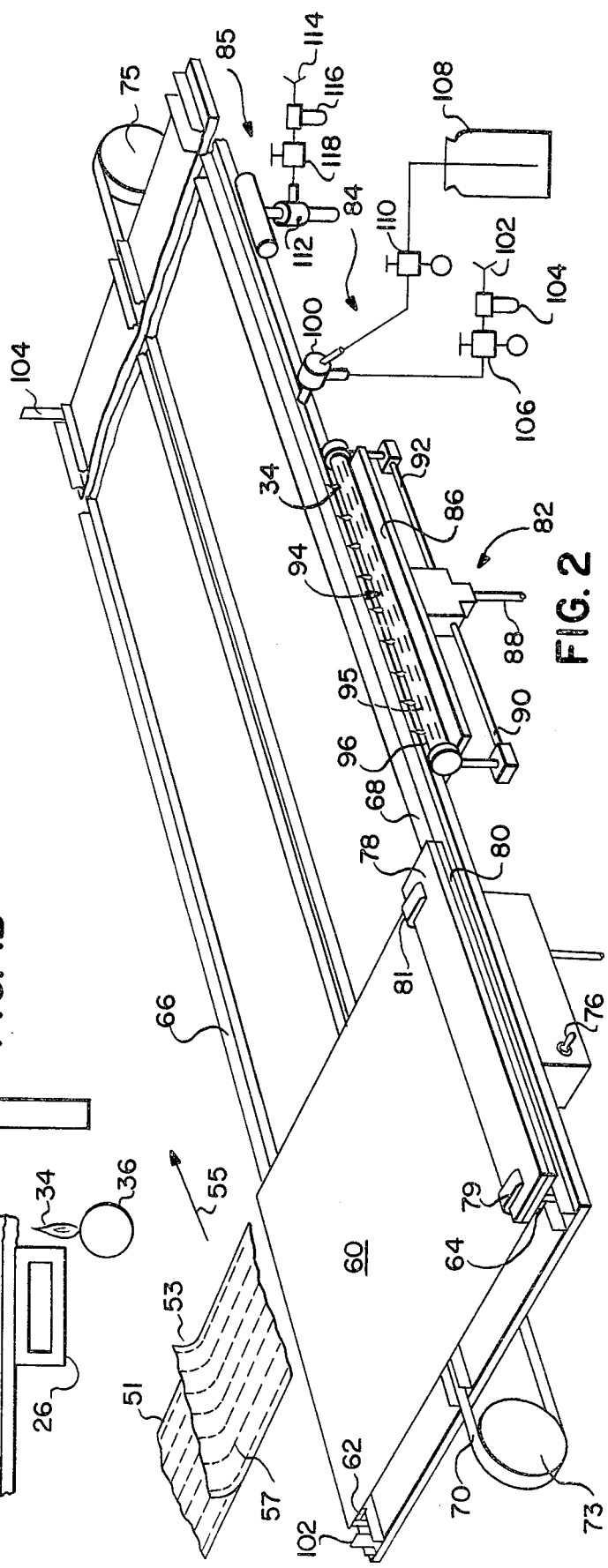

4,243,449

PROCESS FOR SEALING A PLURALITY OF POLYBUTYLENE SHEETS

RELATED APPLICATIONS

The present application is a continuation in-part of co-pending application Ser. No. 763,819, filed Jan. 31, 1977, now abandoned.

BACKGROUND OF THE INVENTION

1. Field of the Invention

The present invention relates to the welding of thermoplastic sheets and, more particularly, to processes, machines and products involving welding a plurality of thermoplastic strata together for use in various products, for example, heavy-duty plastic bags, liners and covers. Difficulties have been encountered in producing seams of uniform appearance and strength in certain thermoplastic materials, particularly polybutylene, which melts at 226° F. and tends to remain tacky even after being cooled below that temperature. Specifically, it has been difficult to produce strong welds in polybutylene sheets because of their characteristic polymeric structure, particularly when of heavy gauge, and it has been difficult to handle sheets, particularly in existing equipment, in which welds have been produced because of the tendency of such welds to remain tacky even when solidified.

2. Summary of the Invention

The primary object of the present invention is the provision of processes, machines and products involving the production of a linearly extending straight or curved seal or weld between two or more susceptible thermoplastic sheets, particularly polybutylene sheets, in the following manner. A relaxed skirt at the edges of the superposed sheets is established by clamping edgewise portions of the sheets at relatively high pressure between a pair of heat conducting members. The skirt is fused by heat at relatively low pressure for a predetermined time to form a weld having a generally round cross section at the edges of the sheets. The weld then is subjected to an aqueous surfactant fluid to control its tackiness so that the product can be handled immediately. Preferably, the heat is applied to the skirt by an elongated manifold which establishes a line of low pressure gas flame that parallels the skirt at the edge of the clamp. Preferably, the seal is substantially transverse with respect to the axial orientation, particularly the monoaxial orientation of both of the thermoplastic sheets. The resulting weld, in cross section, is generally round throughout most of its periphery and joins the sheets at fillets. In various forms, the aqueous surfactant is a mist in which aqueous detergent droplets are propelled by a stream of air, i.e. a mist having an inner phase composed of aqueous detergent and an outer phase composed of air, a liquid stream which flows over the weld, or a liquid bath through which the weld is advanced.

The process of the present invention is applicable to the sealing of thermoplastic sheets and is needed, particularly for the sealing of polybutylene sheets to produce polybutylene products having panels. The present invention speeds formation of a stable seal in order to minimize production delays, which, in the past, have resulted from long solidification and recrystallization times.

Other objects of the present invention will in part be obvious and will in part appear hereinafter.

The invention accordingly comprises the processes, machines, and products, together with their steps, parts, components and interrelationships, the scope of the disclosure of which will be indicated in the appended claims.

BRIEF DESCRIPTION OF THE DRAWINGS

For a fuller understanding of the nature and objects of the present invention, reference is made to the accompanying drawings wherein:

FIG. 1A illustrates a step of the process of the present invention;

FIG. 1B illustrates another step of the process of the present invention;

FIG. 1C illustrates another step of the process of the present invention;

FIG. 2 is a perspective view of a machine incorporating the present invention;

Figure 3:
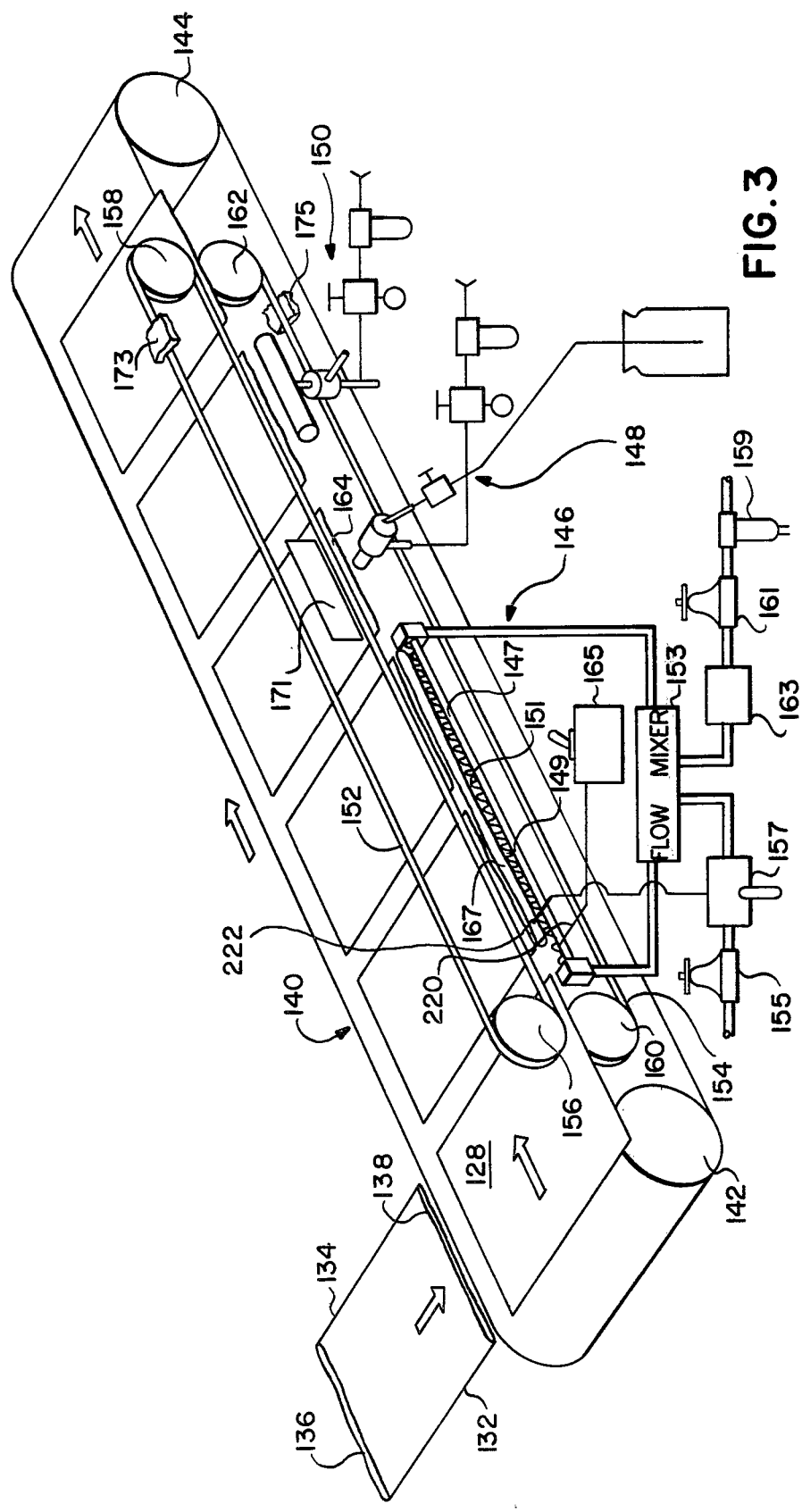
FIG. 3 is a perspective view of another machine incorporating the present invention.

DETAILED DESCRIPTION OF THE PREFERRED EMBODIMENTS THE PROCESS AND PRODUCT OF FIGS. 1A, 1B, AND 1C

Generally, the process illustrated in FIGS. 1A, 1B, and 1C comprises the following steps. First, the edgewise portions of a pair of thermoplastic sheets 20, 22 are clamped in superposition between a pair of elongated pressure plates 24, 26 to establish a skirt 28. The outer edges 30, 32 of plates 24, 26 are aligned. The inner faces of plates 24, 26 are generally flat, parallel and in abutment against the outer faces of sheets 20, 22. Next, skirt 28 is subjected to heat from a line of low pressure flame 34, which is established by an elongated manifold or pipe 36 that is parallel to the aligned edges 30, 32 of plates 24, 26. As will be described more fully below, in one form, pipe 36 has a series of apertures at which individual flames are established and, in another form, has an elongated slot filled with a mesh at which a continuous flame is established. Best results are achieved when an oblique baffle 40 overlies the skirt and the upper edge of plate 24 in order to cause a gentle stream of hot gas to flow upwardly around the fused skirt, shown at 42. An aqueous detergent mist 46 is directed toward the molten weld by a so-called spray transvector 48, which is fed from: a compressed air supply 50 through an air filter 52 and a regulating valve 54; and from a liquid detergent supply 56 through a metering valve 58, in a manner to be described more fully below. As a result of coating and cooling, weld 44 solidifies and its surface immediately becomes non-tacky. As shown, weld 44 is integral with the edges of thermoplastic sheets 20, 22. Weld 44, in cross section, is generally round throughout most of its circumference 49 and is joined to sheets 20, 22 by fillets 47, 51. Along a line perpendicular to the plane of sheets 20, 22, the diameter of circumference 49 is greater than the combined thickness of sheets 20, 22. Also, the radius of curvature of circumference 49 is negative with respect to the radii of curvature of fillets 47, 51.

It has been found that the foregoing process is particularly adapted to produce very strong, non-tacky seals in polybutylene, a material which, in the past, has been difficult to seal efficaciously and which, after being heated above its fusion point, has been characterized by a tackiness that causes adhesion even to such non-adherent surfaces as polytetrafluoroethylene. One such polybutylene is sold under the trademark WITRON by Witco Chemical. Polybutylene, which is the polymerization product of butene-1 monomer, is characterized by high impact resistance, puncture resistance and toughness and by excellent heat and cold resistance. Preferably such sheets range between 0.002 and 0.020 inches in thickness for purposes of the present invention. In accordance with the present invention, the polymeric structure of the seal and the sheets joined by the seal is virtually the same throughout by virtue of the low pressure, high heat transfer, and appropriate dwell time. In other words, there is no discontinuity in density or crystal structure and no shrinkage in the vicinity of the seal. In accordance with the present invention, the surface of the seal becomes non-tacky as soon as solidification occurs without disturbing the interior polymeric structure of the seal. In consequence, resulting configurations and products can be conveyed, stacked, and used immediately. Throughout the foregoing process, there is no solid mechanical contact with the surface of the weld until it has solidified and has acquired a non-tacky surface.

Preferably the thickness of each thermoplastic sheet, for purposes of the present invention, ranges from 2 to 30 mils. In the sealing of polybutylene plastic sheets of the foregoing type, preferably, plates 24, 26 are composed of high heat conductivity metal such as aluminum. Their lengths are slightly longer than the sealing weld 44 that is to be produced. Their heights range from one-eighth inch to one inch and their widths range from one-half to six inches. The initial width of skirt 28 ranges between one-sixteenth and one-half inch depending upon the thickness of the sheets to be sealed. Line of flame 34 is produced at an aperture or slot in pipe 36 by combustion of an aliphatic gas such as natural gas or propane, the pressure of the gas within the pipe being below five pounds per square inch. Baffle 40 is composed of an insulating material such as asbestos board. Preferably the temperature at which skirt 28 is melted ranges from 226° to 400° F., the tip of the flame ranging, in distance from skirt 28, from one-eighth to two inches, and the dwell time ranging from 3 to 30 seconds. Preferably, the aqueous detergent fluid is applied to the weld before any other mechanical contact. Preferably, the air pressure at the transvector air inlet ranges from 10 to 80 pounds per square inch and the rate at which liquid is induced into the air stream ranges from 0.25 to 18.0 gallons per hour. Preferably, the spray consists essentially of water, detergent and air, all at approximately room temperature, the ratio of detergent to water ranging from 1:2 to 1:4. The detergent typically is either anionic or non-ionic and with or without phosphate content.

THE APPARATUS OF FIG. 2

FIG. 2 illustrates an apparatus for performing the process of FIGS. 1A, 1B, 1C. As shown, this apparatus is intended to weld a seam at the superposed edges of a pair of thermoplastic sheets, which extend from a suitable supply roll onto a platform 60. Platform 60 is mounted on a pair of brackets 62, 64, which slide on a pair of elongated guide rails 66, 68. Platform 60 is advanced along the rails by a chain 70, which meshes with a pair of sprockets 73, 75 that are driven by a suitable motor (not shown) under the control of a suitable switch 76. At an edge of platform 60 are a pair of aluminum clamp plates 78, 80, which correspond to plates 24, 26 of FIG. 1. Clamp plates 78, 80 are extended along an edge of platform 60 longitudinally with respect to the direction of travel of platform 60. Clamp plates 78, 80 are constrained for motion with respect to each other by solenoid controlled grippers 79, 81. Clamp plates 78, 80, in operation, move through a heating station 82, a conditioning station 84, and a cooling and drying station, 85 now to be described. For ease of illustration, a counterpart of baffle 40 of FIG. 1 is not shown in FIG. 2 although normally it is present. Two thermoplastic sheets 51, 53 are shown above platform 60 in their proper orientation with respect to their advancement through the machine of FIG. 2 in direction 55. As shown, each of sheets 51, 53 is characterized by an axial orientation, suggested by lines 57, that is, perpendicular to the direction 55.

As shown, heating station 82 includes a support 86, supply conduits 88, 90, 92, and a conduit 94, which is supplied through both its ends with combustible gas from the supply conduits. Conduit 94 has an inner pipe 95 with relatively large apertures and an outer pipe 96 with relatively small apertures. Inner pipe 95 spreads the gas uniformly and feeds the gas at a low pressure to the apertures of outer pipe 96, at which combustion of the gas occurs and flames 34 are generated. Typically, conduit 96 is 20 inches long, is ⅜ inch in outside diameter, is composed of cast iron, and is drilled every quarter inch with 0.0312 inch holes.

As shown, conditioning station 84 includes a so-called spray transvector 100. Transvector 100 is fed with compressed air from a compressed air supply 102 through an air filter 104 and a regulating valve 106. Transvector 100 is fed with aqueous detergent from a liquid aqueous detergent reservoir 108 through a metering valve 110. The inner structure of transvector 100, which is known in the art, includes a small diameter inlet through which the compressed air flows and a surrounding chamber into which ambient air flows. The compressed air develops sonic velocity as it is ejected through the small diameter inlet and causes a rapid flow of surrounding air through the chamber to the outlet. The transvector, in effect, is a gas flow amplifier.

Typically, cooling and drying station 85 comprises a vortex tube 112, which directs cooling air to the solidified weld and which is fed from a compressed air supply 114 through a filter 116 and a regulator 118. Vortex tube 112 includes a small diameter inlet, through which the compressed air flows, and a surrounding chamber, into which ambient air flows. The compressed air develops sonic velocity as it is ejected through the small diameter inlet and causes a rapid flow of chilled air through the chamber to the outlet, which is directed toward the weld.

OPERATION

In operation of the apparatus of FIG. 2, the edgewise portions of a pair of thermoplastic sheets are clamped between plates 78, 80 to provide a skirt as shown in FIG. 1. Next, support 60 is advanced along rails 66, 68 through heating station 82 in such a way that the flames produced at 96 are positioned below the skirt in order to form a molten weld as shown in FIG. 1B. Next, the weld formed in heating station 82 is solidified and its surface is de-tackified in conditioning station 84 in the manner shown in FIG. 1C. Next the solidified weld is cooled to room temperature and dried in cooling and drying station 85. Finally, the pair of thermoplastic sheets are freed from between plates 78, 80, joined along their aligned edges by the weld. Suitable switches 102, 104 are provided to limit the reciprocal motion of platform 60. Preferably, the conveyor length is extended beyond cooling and drying station 85 a distance ranging from ¼ to 4 times the length of stations 82, 84, 85 of the apparatus.

EXAMPLE

In a specific example of the present invention, a pair of six mil (0.006 inch) thick polybutylene sheets were superposed on platform 60 and their edges were clamped between plates 78, 80 to establish a three-sixteenths inch skirt. Plates 78, 80, which were composed of highly thermally conductive aluminum, prevented a rise in the temperature of the region of the sheets adjacent to the skirt. Plates 78, 80 were 33 inches long, 4 inches wide and ¼ inch thick. Platform 60 was moved continuously, at a speed of about 20 to 30 feet per minute, through heating station 82 to convert successive increments of the skirt to a molten weld. The tips of the flames in the heating station were about one inch from the skirt. The temperature of the heating station ranged from 875° F. to 1200° F. The molten weld was solidified and coated with the aqueous detergent solution by transvector 100, which was placed about 3 inches from the molten weld. Air pressure to transvector 100 was 40 pounds per square inch. Comsumption of the detergent solution was approximately 0.25 to 1.00 gallons per hour. The aqueous detergent solution 25 was a mixture of 75% water and 25% household detergent, consisting of anionic and non anionic surfactants. The temperature in cooling and drying station 85 was about 32°-60° F.

THE APPARATUS OF FIG. 3

FIG. 3 illustrates an alternative apparatus for performing the process of FIGS. 1A, 1B, 1C. As shown, this apparatus is intended to weld a seam at the superposed edges of successive pairs of thermoplastic sheets 128. In the form shown, these pairs of sheets are the panels of successive sections of plastic tubing, which includes integral longitudinal edges 132, 134 and open ends 136, 138. Open end 138 of each successive section is sealed in accordance with the present invention to produce a bag. This apparatus comprises an endless conveyor belt 140, which is constrained and driven by a pair of end rolls 142, 144. Along an upper edge of conveyor belt 140 are a heating station 146, a conditioning station 148, and a cooling-drying station 150. Station 148 and station 150 are analogous in all respects to station 84 and station 85 of the apparatus of FIG. 2.

Heating station 146 includes a so-called ribbon burner in the form of a pipe 147 with an elongated slot 149 along its upper edge and a metallic mesh 151 within the slot. As shown, pipe 147 is fed through its opposite ends from a flow mixer 153 which: (1) is fed with gas through an inlet valve 155 and a safety valve 157; and (2) is fed with air through a filter 159, a value 161, and an inspirator 163. An ignition transformer 165 cooperates with a spark electrode 220 to ignite the flame. Valve 157 cooperates with a thermopilot 222 to insure that gas flow is continued only during combustion. As shown in FIG. 3, the line of flame 167 emanates from pipe 147. It is entirely blue and has a temperature in the vicinity of 3,000° F. It is at very low pressure, the distance of this flame from the skirt being such that desired temperature of the skirt is achieved. For ease of illustration, a counterpart of baffle 40 of FIG. 1 is not shown in FIG. 3 although normally it is present.

Extending along the edge and at opposite faces of the upper section of conveyor belt 140 are a pair of endless stainless steel bands 152, 154. Band 152 is constrained and driven by a pair of rolls 156, 158. Band 154 is constrained and driven by a pair of rolls 160, 162. Rolls 156, 158, 160, 162 are driven in synchronism by a suitable drive motor (not shown). As shown, the lower length of band 152 and the upper length of band 154 clamp edgewise portions of successive tubing sections therebetween with successive skirts 164 projecting outwardly toward heating station 146, conditioning station 148 and cooling station 150. The numerical parameters and operational functions of the apparatus of FIG. 3 correspond to those of the apparatus of FIG. 2, except for those of heating station 146. Heating station 146 provides a flame at a gas pressure of 0.01 to 0.20 pounds per square inch, delivering from 100 to 1,000 Btu per hour per lineal inch of flame, depending upon the amount of heat needed to produce good seals. A shield 171 is located at station 148 in order to control the spray of aqueous surfactant on the skirt, which is located between the shield and the spray nozzle. Drying pads 173, 175 are in contact with bands 152, 154 in order to prevent accumulations of aqueous surfactant at undesired locations.

THE APPARATUS OF FIG. 4

Figure 4:
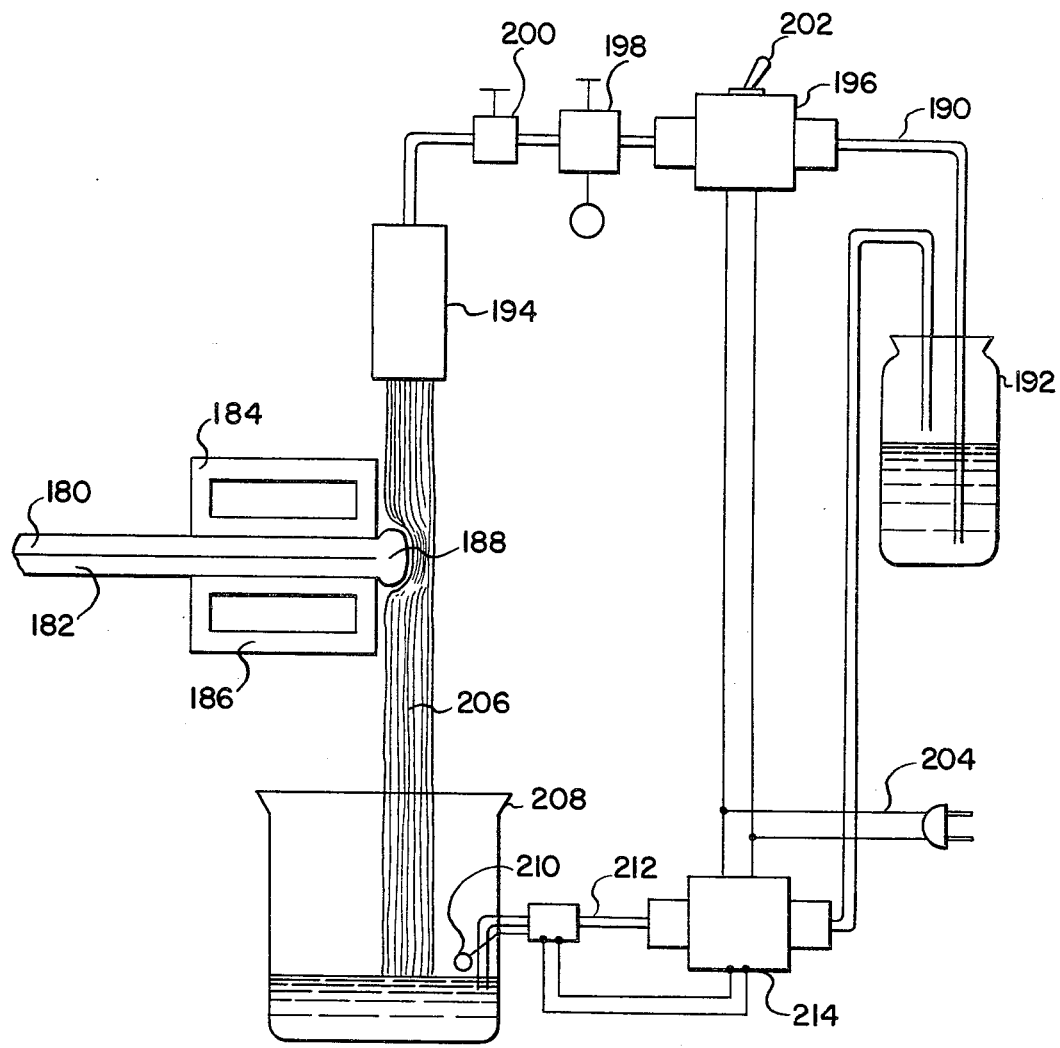
FIG. 4 is a perspective view of a further machine incorporating the present invention.
Figure 5A:
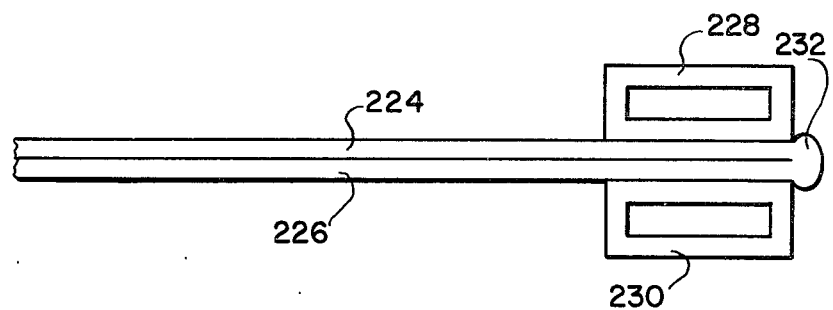
FIG. 5A illustrates a step of another process of the present invention.
Figure 5B:
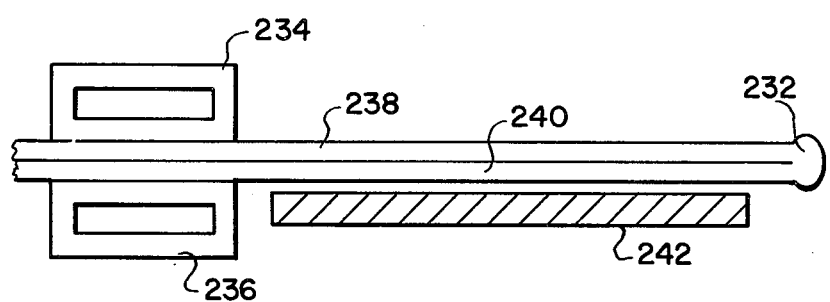
FIG. 5B illustrates another step of the process of FIG. 5A.
Figure 5C:
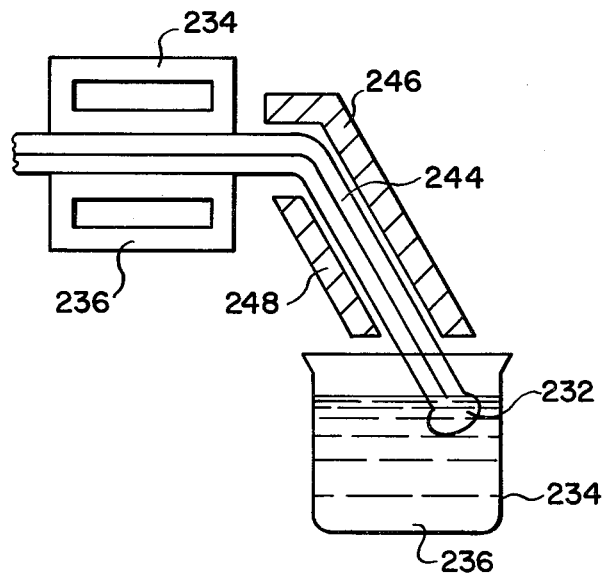
FIG. 5C illustrates another step of the process of 5A.
Figure 5D:
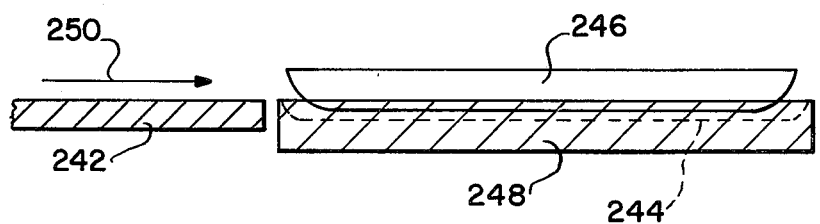
FIG. 5D is a front view of the mechanical structure for performing the step of FIG. 5C.

An alternative fluid applying station, for substitution in the apparatus of either FIG. 2 or FIG. 3, is shown in FIG. 4. Thermoplastic sheets 180, 182 are shown clamped between plates 184, 186, with a molten weld 188 having been formed in accordance with the steps of FIGS. 1A and 1B. As shown, a water pipe 190 is fed from a reservoir 192 of aqueous detergent solution for application to weld 188 through a nozzle 194. The flow of liquid from reservoir 192 to nozzle 194 is generated by an electric pump 196 and regulated by a flow valve 198 and a metering valve 200. Pump 196 includes an off-on switch 202 and an electrical conduit for connection to a power source 204. A steady flow 206 is constantly produced through nozzle 194 in the range of 0.05 to 5 gallons of aqueous detergent solution per hour. As the weld is advanced through this flow, it is coated with the solution, thereby solidifying and becoming non-tacky. Vortex cooling is then applied to the weld in order to cool it to room temperature and to dry its surface. Excess solution which does not contact the molten weld or which drips off the molten weld is collected in a receptacle 208. Inside receptacle 208 is a limit switch 210, which is connected through a pipe 212 to a pump 214. Pump 214 feeds the solution back to reservoir 192. As the solution level rises to the limit switch, pump 214 is energized and the liquid in receptacle 208 is fed back to reservoir 192 for efficient use of the solution.

THE PROCESS AND PRODUCT OF FIGS. 5A, 5B, 5C, AND 5D

The process illustrated in FIGS. 5A, 5B, 5C, and 5D comprises the following steps. First, the edgewise portions of a pair of thermoplastic sheets 224, 226 are clamped in superposition between a pair of elongated pressure plates 228, 230 to establish a skirt and the skirt is fused to form a weld 232, all as in FIGS. 1A and 1B above. As previously indicated, weld 232 is tacky. Next, the edgewise portions are released by plates 228, 230 and are gripped by a second pair of plates 234, 236 at a location that is relatively remote from weld 232. Portions 238, 240 now slide forwardly (into the plane of the drawing) on a stationary stage 242. Then portions 238, 240 advance into the channel 244 between a pair of turning plates 246, 248, with weld 232 projecting freely and downwardly therefrom. As portions 238, 240 advance through channel 244, bead 232 advances through a trough 234, which contains an aqueous detergent of the same composition previously mentioned herein in connection with FIG. 4. The direction of portions 224, 226 over stage 242 through channel 244 is shown at 250.

The present invention thus provides processes, machines and products involving the efficacious sealing of thermoplastic sheets, particularly polybutylene sheets. It is to be understood that the present invention contemplates other heating and cooling techniques than those shown above. Specifically, instead of the gas combustion generated heat illustrated above, in an alternative embodiment, infrared radiation is focused on the skirt and a gentle upward air current is directed toward the underside of the skirt in order to duplicate the intended effect. Since certain changes may be made in the foregoing disclosure without departing from the objects hereof, it is intended that all matter described in the foregoing specification and shown in the accompanying drawings, be interpreted in an illustrative and not in a limiting sense.

What is claimed is:

1. A process for sealing a plurality of polybutylene sheets, said process comprising:
   (a) clamping edgewise portions of said polybutylene sheets between a pair of elements to establish a skirt;
   (b) heating said skirt to provide a molten weld having a tacky surface along an edge of said polybutylene sheets; and
   (c) subjecting said weld to an aqueous solution of a surfactant in order to cause said weld to have a non-tacky surface.

2. The process of claim 1 wherein said skirt is relaxed.

3. The process of claim 1 wherein said heating is affected by a flame at low pressure.

4. The process of claim 1 wherein said weld has a larger diameter than the combined thickness of said sheets.

5. The process of claim 1 wherein said clamping elements are composed of a high heat conductivity metal.

6. A process for sealing a plurality of polybutylene sheets, said process comprising:
   (a) clamping edgewise portions of said polybutylene sheets between a pair of elements to establish a skirt;
   (b) heating said skirt to provide a molten weld having a tacky surface along an edge of said polybutylene sheets; and
   (c) subjecting said weld to an aqueous solution of a surfactant in order to cause said weld to have a non-tacky surface;
   (d) said aqueous solution being a bath.

7. A process of sealing a plurality of polybutylene sheets, said process comprising:
   (a) clamping edgewise portions of said polybutylene sheets between a pair of elements to establish a skirt;
   (b) heating said skirt to provide a molten bead along an edge of said polybutylene sheets; and
   (c) conditioning said molten bead to form a solid seal, said conditioning including subjecting said bead to an aqueous solution of a surfactant;
   (d) said elements including a pair of aligned upper and lower plates with aligned edges at said skirt, the free lower corner of the edge of the lower plate being chamfered.

8. A process for sealing a plurality of polybutylene sheets, said process comprising:
   (a) clamping edgewise portions of said polybutylene sheets between a pair of elements to establish a skirt;
   (b) heating said skirt to provide a molten edge of said polybutylene sheets; and
   (c) subjecting said weld to an aqueous solution of a surfactant in order to cause said weld to have a non-tacky surface;
   (d) said aqueous solution being a mist.

9. A process for sealing a plurality of polybutylene sheets, said process comprising:
   (a) clamping edgewise portions of said polybutylene sheets between a pair of elements to establish a skirt;
   (b) heating said skirt to provide a molten weld having a tacky surface along an edge of said polybutylene sheets; and
   (c) subjecting said weld to an aqueous solution of a surfactant in order to cause said weld to have a non-tacky surface;
   (d) said aqueous solution being a stream.

10. A process for sealing a plurality of polybutylene sheets, said process comprising:
    (a) clamping edgewise portions of said polybutylene sheets between a pair of elements to establish a skirt;
    (b) heating said skirt to provide a molten bead along an edge of said polybutylene sheets; and
    (c) subjecting said bead to cooling and to an aqueous surfactant in order to produce a substantially non-tacky surface thereon.

11. The process of claim 10 wherein said clamping elements are composed of a high heat conductivity metal.

12. The process of claim 10 wherein said heating is affected by a flame at low pressure.

13. The process of claim 10 wherein said elements include a pair of aligned upper and lower plates with aligned edges at said skirt, the free lower corner of the edge of the lower plate being chamfered.

14. The process of claim 10 wherein said skirt is relaxed.

15. The process of claim 14 wherein said bead has a larger diameter than the combined thickness of said sheets.

* * * * *